United States Patent [19]
Cecil et al.

[11] 3,732,155
[45] May 8, 1973

[54] TWO-STAGE HYDRODESULFURIZATION PROCESS WITH HYDROGEN ADDITION IN THE FIRST STAGE

[75] Inventors: Richard R. Cecil; Thomas E. Fink, both of Baton Rouge, La.

[73] Assignee: Esso Research and Engineering Company, Linden, N.J.

[22] Filed: Mar. 31, 1971

[21] Appl. No.: 129,946

[52] U.S. Cl. ................................. 208/210, 208/216
[51] Int. Cl. ............................................. C10g 23/00
[58] Field of Search ....................... 208/212, 209, 58, 208/88, 89, 213, 243, 244, 216, 214, 210

[56] References Cited

UNITED STATES PATENTS

| | | | |
|---|---|---|---|
| 3,509,044 | 4/1970 | Adams et al. | 208/216 |
| 3,654,139 | 4/1972 | Winsor et al. | 208/212 |
| 2,769,760 | 11/1956 | Annable et al. | 208/212 |
| 2,761,815 | 9/1956 | Hutchings | 208/212 |

Primary Examiner—Delbert E. Gentz
Assistant Examiner—G. J. Crasanakis
Attorney—Pearlman & Schlager and Llewellyn A. Proctor

[57] ABSTRACT

A process wherein sulfur-containing light or heavy hydrocarbon feeds are contacted with sulfur-resistant catalysts and desulfurized. The process involves a combination of steps, viz., an initial step wherein the feed is contacted with the catalyst in the presence of hydrogen and desulfurized, hydrogen, light ends and by-product hydrogen sulfide are separated from the partially desulfurized product and a subsequent step wherein said product is contacted with catalyst without the addition of any hydrogen to said step. Better hydrogen utilization and efficiency are obtained in the total desulfurization of the feed.

18 Claims, No Drawings

TWO-STAGE HYDRODESULFURIZATION PROCESS WITH HYDROGEN ADDITION IN THE FIRST STAGE

This invention relates to the treatment of sulfur-bearing hydrocarbon feeds in a process combination to effect desulfurization of said feeds under conditions which maximize hydrogen utilization. In a typical embodiment, a first stage hydrodesulfurization reaction is followed by a second desulfurization reaction, without added hydrogen.

The importance of processes which utilize hydrogen in the treatment of hydrocarbon feeds to improve such qualities as stability, color hold, bromine number, or to remove impurities such as sulfur, nitrogen, or other undesirable components, e.g., catalyst poisons, is well established in petroleum refining operations. In such processes hydrogen is often consumed in excess of the stoichiometric quantities actually required to eliminate the undesirable component or components. For example, aromatic feed components are partially saturated, and at sufficiently severe conditions these components are almost fully saturated. In hydrodesulfurization processes, considerably more hydrogen is used up than needed to react with the sulfur to form hydrogen sulfide or other disposable sulfur compounds. This excess hydrogen is essentially wasted, and often the product value is actually decreased. Excessively high pour point is often a problem with fuel oils produced by hydrodesulfurization processes, and excessive hydrogen may decrease the heating value of such fuel oils. In processes wherein the severity of the reactions is high, hydrogen waste is particularly acute. Hydrogen is a relatively expensive commodity and hydrotreating processes are likewise relatively expensive, due also to the cost of associated compression, recirculation and high pressure equipment.

A hydrodesulfurization process is a type of process wherein hydrogen is added as a treating medium. It is similar to a hydrofining process, differing therefrom primarily in that the type of feed processed is generally a virgin gas oil, cat cycle stock, or even a heavy residuum rather than a light gas oil or naphtha. The heavier feeds, however, are by far the more difficult to desulfurize in that the sulfur of the heavier feeds is contained within relatively more complex ring structures whereas, in contrast, the lighter feeds generally contain simpler components and more of the sulfur is often attached to the ring, or contained in the chains. In short, sulfur removal from the lighter hydrocarbon fractions is considerably less difficult than removal of sulfur from the heavier feeds which requires more drastic treatment. In any event, for the most part it is undesirable to have any appreciable amount of sulfur within any petroleum product, particularly in fuel oils which burn to produce sulfur dioxide, a particularly noxious and corrosive gas.

In a typical hydrodesulfurization process a hydrocarbon feed is passed, with hydrogen, through a heater and then downwardly through a multiple fixed bed reactor containing a sulfur-resistant catalyst containing a hydrogenation-dehydrogenation (hydrogen transfer) component. The several beds of the reactor are generally separated one from another and sometimes liquid-liquid heat exchangers are located between the beds, or a hydrogen quench gas, or stream (water), is often fed into the spaces between the beds for temperature control. The effluent from the reactor is fed to a high temperature-high pressure separator wherefrom hydrogen, hydrogen sulfide and light ends are removed and desulfurized oil is then passed to a high temperature-low pressure separator for further removal of hydrogen, hydrogen sulfide and light ends. Desulfurized oil from the latter separator can then be passed to a stripper wherein steam is injected for further separation of hydrogen sulfide and naphtha. Finished desulfurized oil product can be removed from the bottom of the stripper.

A two-stage process for desulfurizing a hydrocarbon feed is disclosed and claimed in co-pending application Ser. No. 793,784 filed Jan. 24, 1969 by Clark E. Adams and Charles N. Kimberlin, Jr. Pursuant to this process the hydrocarbon feed is contacted with a sulfur-resistant catalyst in a first reaction (or stage) in the absence of hydrogen to form a partially desulfurized product (non-hydro desulfurization). This product is then fed into a second reactor (or stage) and contacted with a similar sulfur-resistant catalyst in the presence of hydrogen to further desulfurize the oil (hydrodesulfurization). Both of the reactors are operated under similar process conditions. The conditions are common for those ordinarily employed in hydrodesulfurization reactions.

This prior art combination non-hydro desulfurization-hydrodesulfurization process has produced some economies in hydrogen utilization as contrasted with ordinary hydrodesulfurization, industry's prime sulfur removal process. Unfortunately, however, there is yet considerable waste of hydrogen. Far more hydrogen equivalents are consumed than theoretically required for the desired desulfurization, and the proportion of excess hydrogen consumed increases rapidly as the level of hydrodesulfurization is raised, as is presently being demanded by more and more stringent pollution laws. Catalyst activity maintenance is quite poor. The possibility that even greater benefits might yet be achieved was completely unrecognized, perhaps largely due to a preoccupation or over-emphasis on elimination of the more easily removable sulfur compounds in the first stage non-hydro desulfurization zone prior to contact with hydrogen in the second stage.

It is nonetheless a primary objective of the present invention to obviate these and other prior art difficulties, and especially to provide an improved process for optimum utilization of hydrogen in a series of desulfurization reactions.

A particular object of the present invention is to provide a multistage process utilizing a hydrodesulfurization step, or steps, with a subsequent non-hydro desulfurization step, or steps.

A more particular object is to provide a process especially suitable for desulfurizing coker stocks, gas oils, light cat cycle stocks, and even the more difficult-to-process whole crudes, reduced or topped crudes and petroleum residuum feedstocks at relatively low net hydrogen consumption, as contrasted with prior art processes.

Another object is to provide such process wherein better catalyst utilization and activity maintenance are achieved, with less high pressure equipment, and yet with improved product qualities.

These objects and others are achieved in accordance with the present invention which contemplates a process wherein sulfur-containing hydrocarbon feeds are contacted with sulfur-resistant catalyst and progressively desulfurized in a combination of steps or stages, viz., an initial step, or steps, wherein the feed is contacted with the catalyst in the presence of hydrogen and partially desulfurized, and a subsequent step, or steps, wherein the feed is contacted with catalyst, without the presence of hydrogen, and further desulfurized.

The order in which these steps are carried out is critical. A hydrodesulfurization step must precede a non-hydro desulfurization step. It is essential, to achieve the benefits of this invention, that hydrogen be added with the feed in an initial step, e.g., the first reactor of a series, and contacted with the catalyst at conditions sufficient to partially desulfurize the feed. In this manner hydrogen-sulfur bonds of the hydrocarbon compounds are broken and hydrogen sulfide is generated in this initial step, referred to as hydrodesulfurization. Some saturation of sulfur-containing rings is also produced. In a subsequent step, e.g., a second reactor of the series, no hydrogen is added, but conditions are maintained sufficient to produce further desulfurization of the feed. As a result, generally significantly more effective removal of sulfur occurs than would occur, e.g., if a feed were simply fed to this stage without the initial hydrogen treatment.

The reasons for this phenomenon are not understood, and while applicants do not desire to be bound by a theory of mechanism, it is believed that hydrogen donor compounds are formed from the excess hydrogen necessarily added or injected into the hydrodesulfurization step, or steps. The hydrogen donor compounds are carried with the feed to a subsequent non-hydro desulfurization step, or steps, the hydrogen from these compounds being given up in the ensuing desulfurization reaction to combine with carbon bond free valencies and to form hydrogen sulfide from the cracked products of the reaction wherein carbon-sulfur bonds are broken.

The present process is materially different from that described in application Ser. No. 793,784, supra, wherein the sulfur compounds removed in the first stage are merely those which can be removed by mild hydrogenation, the more difficult-to-desulfurize compounds passing on to the second stage of the series wherein even more hydrogen is required to effect hydrodesulfurization than would normally be required because of the dehydrogenation resulting in the first stage non-hydro reaction. In contrast, in accordance with the present invention, e.g., even the highly aromatic thiophenic structures which require several times more hydrogen to remove than most other sulfur-bearing compounds are removed in an initial stage, and relatively less hydrogen is used up in this reaction. Moreover, the excess hydrogen that is used is reused, or released, in the subsequent non-hydro stage and greater over-all desulfurization is obtained with less over-all hydrogen consumption. In fact, considerably less hydrogen is used in accordance with this invention to achieve corresponding or even greater desulfurization as contrasted with hydrodesulfurization processes per se, or with the "non-hydro first step" approach of our colleagues.

In accordance with a preferred and practical process embodiment, hydrodesulfurization of a more typical sulfur-containing feed is conducted in a first reaction zone (reactor), with or without a diluent such as steam, using a conventional sulfur-resistant hydrogenation-dehydrogenation catalyst and the feed is desulfurized at conditions sufficient to produce up to about 90, generally from about 40 to about 90, and preferably from about 60 to about 80, percent desulfurization of the feed. The partially desulfurized feed is then contacted in a second reaction zone (reactor), without added hydrogen, with the same or a different conventional sulfur-resistant hydrogenation-dehydrogenation catalyst and the feed again reacted at conditions sufficient to further desulfurize the feed, generally to about 90, and preferably to again effect from about 40 to about 90, and more preferably from about 60 to about 80 percent removal of the sulfur remaining in the feed.

Both the hydrodesulfurization and non-hydro desulfurization stages can be operated within a fairly wide range of conditions sufficient to produce desulfurization of a feed, dependent to a large extent on the nature of the feed, the nature of the catalyst and the degree of desulfurization desired. The temperature within a reaction zone, of course, is rarely ever uniform since the nature of reactions is generally endothermic or exothermic, particularly the latter. For example, in employing hydrodesulfurization catalysts, outlet temperatures are generally greater than inlet temperatures, and the intensity of the former are dependent upon such factors as catalyst activity, catalyst bed depth, feed temperature, and the extent of hydrodesulfurization. For this reason, such temperatures are best defined in terms of Equivalent Isothermal Temperatures (E.I.T. temperature), defined as the temperature at which the catalyst of a truly isothermal unit will use its activity at the same rate as the catalyst of a non-isothermal unit with which it is compared. Typical conditions for the operation of such units are as follows:

| Major Operating Variables | Hydrodesulfurization Stage | |
|---|---|---|
| | Typical Operating Range | Preferred Operating Range |
| Temperature (E.I.T), °F. | | |
| Start-of-Run | 550–800 | 625–710 |
| End-of-Run | 850 | 800 |
| Pressure, Psig | 300–5000 | 500–3000 |
| Inlet Gas, SCFB | 500–10,000 | 1000–5000 |
| Volume % Hydrogen (% Purity) | 50–90 | 70–85 |
| Feed Rate, V/Hr./V | 0.1–10 | 0.5–2 |
| | Non-Hydro Desulfurization Stage | |
| Temperature (E.I.T), °F. | | |
| Start-of-Run | 625–800 | 675–730 |
| End-of-Run | 850 | 765 |
| Pressure, Psig | 50–3000 | 150–1000 |
| Inlet Gas, SCFB | | |
| Volume % Hydrogen (% Purity) | | |
| Feed Rate, V/Hr./V | 0.05–10 | 0.5–2 |

Virtually any sulfur-containing feedstock can be processed, but the process has greatest utility for processing sulfur-containing feedstocks of which over 50 percent of the feed boils within a range of from about 700° to about 950° F., which contain from about 2 to about 5 percent sulfur; and including higher boiling materials and petroleum hydrocarbon residuum feedstocks which contain relatively large amounts of sulfur, asphaltenes, metals and ash. Feedstocks comprise normally liquid and solid hydrocarbons which at the temperature of desulfurization are in the fluid state, i.e., in the liquid or vapor state, and the products of conversion are frequently lower boiling materials. Such feedstocks include: coker stocks, light and heavy gas oils, cat cycle stocks, petroleum crude oils, and topped or reduced crude oils or distillates, including black oils, heavy cycle stocks, visbreaker liquid effluents, crude tower bottoms products, and the like. Vacuum gas oils, especially those wherein at least 50 weight percent thereof boils at a temperature of over 700° F., and more preferably those wherein about 80 percent and more of the feed boils within a range of from about 700° F. to about 950° F., are more preferred.

The catalysts useful in the practice of this invention vary to some extent in both their physical form and chemical composition, depending upon the type of feed to be processed. The catalyst is characterized as a composite containing a metallic or metallic compound component, having hydrogenation-dehydrogenation activity, and a refractory inorganic oxide base of either natural or synthetic origin. Exemplary of such bases are alumina, silica, zirconia, magnesia, titania, boria, hafnia, and mixtures of two or more of such oxides, including silica-alumina, alumina-silica-boron, silica-zirconia, silica-magnesia, silica-titania, magnesia-titania, and the like. Silica and alumina bases are widely employed for a variety of reasons, catalysts often including naturally-occurring activated clays and synthetically prepared composites which have long been recognized as useful in promoting desulfurization reactions. The catalyst is sulfur-resistant in that the presence of sulfur does not significantly adversely affect its activity at the conditions of operation, and one or more promoting metal compounds such as oxides or sulfides of a Group VIB, e.g., molybdenum or tungsten, either alone or in admixture with one or more oxides or sulfides of a Group VIII metal compound, e.g., nickel or cobalt, are employed. Preferred catalysts are obtained by depositing such Group VIB or Group VIII iron group metal compounds, or both, on an alumina support or support comprising a combination of silica and alumina. Likewise, other promoting metal oxides may be employed in conjunction with a support containing silica or alumina, or both. The catalyst can be in the form of beads, extrudates, tablets or pellets, or the like, depending upon the type of process conditions to which it will be exposed.

Preferred catalysts are composites of nickel oxide with molybdenum oxide or cobalt oxide with molybdenum oxide, used in the following approximate proportions: 1 to 15 weight percent, preferably 1 to 10 weight percent, of nickel or cobalt oxide, 5 to 25 weight percent, preferably 10 to 20 weight percent of tungsten or molybdenum oxides on a suitable support, such as alumina or alumina containing small amounts of silica. A particularly preferred support is alumina containing 1 to 6 weight percent silica wherein the surface area of the catalyst support, in pores having a diameter of 30 to 70 A is at least 100 square meters per gram, preferably 100 to 300 square meters per gram. These catalysts are preferably used in the sulfide forms.

The invention will be better understood by reference to the following non-limiting examples which demonstrate its more salient features, as well as the preferred mode of practicing the invention.

In preparation for the runs, catalyst of 1/16 inch particle size is charged into a hydrodesulfurization reactor, the first reactor of a series. The catalyst charged to the non-hydro desulfurization reactor, the second reactor of the series, is predominantly 14–35 mesh (Tyler). The catalysts of both reactors are activated by sulfiding in at 50 psig with a gaseous mixture of 10 percent hydrogen sulfide in hydrogen while the temperature is raised from 250° to 750° F. over a 12-hour period. Upon cooling to operating temperature, the non-hydro desulfurization reactor is purged with nitrogen for 1 hour, prior to cutting in feed. Product samples are collected, stripped with nitrogen until free of hydrogen sulfide, and filtered. Sulfur is determined by the X-ray fluorescence method, and corrections are made for hydrocarbons lost in stripping where required.

EXAMPLE 1

A run is made wherein a Safaniya vacuum gas oil feed containing 2.65 weight percent sulfur is introduced into the first of a series of two reactors, each containing a catalyst comprising 3.0 weight percent CoO and 12.5 weight percent $MoO_3$ on an alumina base containing 2 weight percent silica. The surface area of the catalyst base, in pores having a diameter of 30–70 A, is 300 square meters per gram. An inspection of the feed introduced to the first reactor is given in Column 2 of the following Table 1 as follows:

TABLE 1

HYDRODESULFURIZATION STAGE

Temperature, °F. = 630
Pressure, psig = 1000
Feed Rate, V/Hr./V = 1.0
Hydrogen Rate = 1500 SCF/Bbl.

| | Feed | Product |
|---|---|---|
| Gravity, °API | 23.2 | 27.2 |
| Sulfur, Wt. % | 2.65 | 0.62 |
| Carbon, Wt. % | 85.06 | 86.68 |
| Hydrogen, Wt. % | 12.11 | 12.76 |
| Nitrogen, Wt. % | 0.07 | 0.04 |
| Nickel, ppm | <1 | <1 |
| Vanadium, ppm | <1 | <1 |
| Con Carbon, Wt. % | 0.10 | 0.04 |
| Distillation | | |
| IBP, °F. | 543 | 440 |
| 5% | 626 | 600 |
| 10% | 666 | 646 |
| 20% | 720 | 702 |
| 30% | 755 | 740 |
| 40% | 784 | 769 |
| 50% | 805 | 795 |
| 60% | 821 | 815 |
| 70% | 835 | 832 |
| 80% | 854 | 854 |
| 90% | 878 | 887 |
| 95% | 904 | 910 |
| FBP | 952 | 950 |
| % Recovered | 97.0 | 99.5 |
| % Residue | 3.0 | 0.5 |

The product of the first reactor, which is operated at a temperature of 630° F., a pressure of 1,000 psig, and a feed rate of 1.0 V/Hr./V and a hydrogen recycle rate of 1,500 SCF/Bbl., is as characterized in Column 3 in the above Table 1.

The liquid product of the hydrodesulfurization stage, after separation of hydrogen and light gases, is then fed into the second reactor of the series operated at a feed rate of 0.50 V/Hr./V, and at a pressure of 200 psig. No hydrogen is added. The level of the sulfur in the product or effluent from the non-hydro reactor is 0.23 weight percent, a desulfurization of 63 percent in the non-hydro stage alone; and an over-all desulfurization of 91 percent, based on the sulfur level of the original feed.

It is further found that 70 SCF/B of product hydrogen is obtained in the second stage, so that the net result is that only about 150 SCF/Bbl. of hydrogen is consumed in the over-all desulfurization process. This is sharply contrasted with a hydrodesulfurization process per se wherein 330 SCF/Bbl. of hydrogen is consumed in producing a corresponding amount of desulfurization.

A feature of the invention is that it is quite feasible to recover hydrogen in the non-hydro desulfurization stage of the series under a wide range of operating conditions. Essentially all that is required is to operate the non-hydro desulfurization stage at a lower hydrogen partial pressure than required for hydrogenation at the conditions, this condition being very easily reached since no hydrogen is added to the non-hydro desulfurization stage and therefore the only hydrogen that is present is that which is released by compounds oversaturated by the hydrodesulfurization reactions which occur in the first stage. Hydrogen release is effected in the second stage generally by merely operating the non-hydro desulfurization stage at lower operating pressures than were used in the hydrodesulfurization stage.

In a further series of runs, sulfur-containing feeds are introduced to a hydrodesulfurization reactor as described by reference to Example 1 and partially desulfurized at conditions sufficient to hydrogenate the feed and produce products having lesser but varying amounts of sulfur. Illustrative of such feeds which can be hydrodesulfurized, and the products of such hydrodesulfurization, are characterized in the following Table 2. The products resulting from the hydrodesulfurization of the Safaniya vacuum gas oil described by reference to Column 2 of the table are those characterized as Product Sample Nos. A, B, C and D, and that which is characterized as Product Sample No. E is obtained by hydrodesulfurization of the Safaniya atmospheric residuum described by reference to Column 3 of the table. In obtaining these products, the conditions of hydrodesulfurization are within the range of values defined below.

TABLE 2

Temperature, °F. = 625–700
Pressure, Psig = 1000–2500
Feed Rate, V/Hr./V = 0.3–1.0
Hydrogen Rate, SCF/Bbl. = 1500–3000

| Feed Stock | Safaniya VGO | Safaniya AR |
|---|---|---|
| Gravity, °API | 20.2 | 14.5 |
| Sulfur, Wt. % | 3.02 | 3.94 |
| Carbon, Wt. % | 85.20 | 84.41 |
| Hydrogen, Wt. % | 11.79 | 11.13 |
| Nitrogen, Wt. % | 0.07 | 0.24 |
| Nickel, ppm | 0.3 | 20 |
| Vanadium, ppm | 0.4 | 78 |
| Con Carbon, Wt. % | 0.37 | 11.8 |
| Distillation | | |
| IBP, °F. | 555 | 458 |
| 5% | 710 | 569 |
| 10% | 772 | 633 |
| 20% | 815 | 723 |
| 30% | 847 | 801 |
| 40% | 857 | 873 |
| 50% | 895 | 958 |
| 60% | 896 | 1047 |
| 70% | 913 | |
| 80% | 931 | |
| 90% | 949 | |
| 95% | 963 | |
| FBP | 971 | 10.47 |
| % Recovered | 92.7 | 60 |
| % Residue | 7.3 | 40 |

Product (of Hydrodesulfurization)

| Prod. Sample No. | A | B | C | D | E |
|---|---|---|---|---|---|
| °API | 25.7 | 27.4 | 27.1 | 26.3 | 22.0 |
| Sulfur, Wt.% | 1.20 | 0.55 | 0.62 | 0.88 | 1.07 |
| Carbon, Wt.% | 86.28 | 86.64 | 86.68 | 86.51 | 86.80 |
| Hydrogen, Wt.% | 12.56 | 12.82 | 12.76 | 12.69 | 12.00 |

These products (viz., A, B, C, D and E) are then employed as feeds to a non-hydro desulfurization reactor. The conditions of the non-hydro desulfurization reactions and the results achieved are summarized in Table 3, below:

TABLE 3.—CATALYTIC NON-HYDRO DESULFURIZATION OF PREVIOUSLY HYDRODESULFURIZED SAFANIYA FEEDSTOCKS

[700° F., Co-Mo/Al₂O₃ catalyst, 200 p.s.i.g.]

| | Example Number | | | | | | |
|---|---|---|---|---|---|---|---|
| | 2 | 3 | 4 | 5 | 6 | 7 | 8 |
| Feed No. | A | B | C | C | C | D | E |
| Feed sulfur, wt. percent | 1.20 | 0.55 | 0.62 | 0.62 | 0.62 | 0.88 | 1.07 |
| Feed rate, v./hr./v. | 0.25 | 0.125 | 0.50 | 0.25 | 1.0 | 0.25 | 0.25 |
| Product sulfur, wt. percent for day— | | | | | | | |
| 5 | 0.36 | 0.11 | 0.22 | 0.15 | 0.29 | 0.25 | 0.85 |
| 20 | | 0.11 | 0.23 | 0.17 | 0.28 | | |
| 40 | | | 0.24 | | | | |
| 60 | | | 0.25 | | | | |
| 80 | | | 0.26 | | | | |
| Desulfurization, percent | 70 | 80 | 63 | 76 | 55 | 72 | 21 |

It is apparent that various modifications can be made in the conditions of operation, the precise nature of the feed and catalyst compositions, and the like, without departing the spirit and scope of the invention.

Having described the invention, what is claimed is:

1. A process for desulfurizing a sulfur-containing hydrocarbon feed which, in combination, comprises:

contacting the feed in an initial stage with a sulfur-resistant hydrogenation-dehydrogenation catalyst, and hydrogen, to produce a catalytic hydrodesulfurization reaction which produces hydrogen sulfide, light ends and a partially desulfurized product, separating hydrogen, light ends and by-product hydrogen sulfide from the partially desulfurized product, and then contacting the said partially desulfurized product in a subsequent stage with a sulfur-resistant hydrogenation-dehydrogenation catalyst, in the absence of added hydrogen, to further desulfurize the product of the initial stage in a catalytic desulfurization reaction wherein hydrogen sulfide is produced.

2. The process of claim 1 wherein the hydrodesulfurization and desulfurization stages are carried out within the range of conditions described as follows:

| | Hydrodesulfurization Stage | Desulfurization Stage |
|---|---|---|
| E.I.T. Temp., °F. | | |
| Start-of-Run | 625–710 | 625–800 |
| End-of-Run | 850 | 850 |
| Pressure, Psig | 300–5000 | 50–3000 |
| Inlet Gas, SCFB | 500–10,000 | |
| Volume % Hydrogen (% Purity) | 50–90 | |
| Feed Rate, V/Hr./V | 0.1–10 | 0.05–10 |

3. The process of claim 1 wherein desulfurization within the hydrodesulfurization and desulfurization stages is carried out in liquid phase within a range of conditions substantially as described below:

|  | Hydrodesulfurization Stage | Desulfurization Stage |
|---|---|---|
| E.I.T. Temp., °F. |  |  |
| Start-of-Run | 625–710 | 675–730 |
| End-of-Run | 800 | 765 |
| Pressure, Psig | 500–3000 | 150–1000 |
| Inlet Gas, SCFB | 1000–5000 |  |
| Volume % Hydrogen (% Purity) | 70–85 |  |
| Feed Rate, V/Hr./V | 0.5–2 | 0.5–2 |

4. The process of claim 1 wherein the catalyst is selected from the group consisting of a mixture of the oxides and sulfides of Group VIB and iron group metals.

5. The process of claim 4 wherein the catalyst is comprised of from about 1 to about 15 weight percent of nickel or cobalt sulfide, and from about 5 to about 25 weight percent of tungsten or molybdenum sulfide on an alumina support containing from about 1 to about 6 weight percent silica.

6. The process of claim 5 wherein the catalyst support has a surface area ranging in pores having a diameter of from about 30 to about 70 A diameter of at least about 100 square meters per gram.

7. The process of claim 1 wherein the sulfur-containing hydrocarbon feed is characterized as one wherein at least 50 weight percent thereof boils at a temperature of over 700° F.

8. The process of claim 7 wherein the sulfur content of said hydrocarbon feed ranges from about 2 to about 5 weight percent.

9. The process of claim 8 wherein the feed is a gas oil.

10. The process of claim 7 wherein the hydrocarbon feed is a petroleum residuum.

11. The process of claim 1 wherein the desulfurization stage is operated at pressures sufficiently low that hydrogen is released, and hydrogen partial pressures generated within the said stage are lower than employed in the initial hydrodesulfurization stage.

12. A process for desulfurizing a sulfur-containing hydrocarbon feed which, in combination, comprises:

contacting the feed in an initial stage with a sulfur-resistant catalyst comprising a Group VI-B or iron group metal component, or mixtures of said metal components, including their oxides and sulfides, supported on a refractory inorganic oxide base, in the presence of hydrogen, to desulfurize from about 40 to 90 percent of the feed in a catalytic hydrodesulfurization reaction which produces hydrogen sulfide, light ends, and a partially desulfurized product, separating hydrogen, light ends, and by-product hydrogen sulfide from the partially desulfurized product, and then contacting the said partially desulfurized product in a subsequent stage with a sulfur-resistant catalyst comprising a Group VI-B or iron group metal component, or mixture of said components, including their oxides and sulfides, supported on a refractory inorganic oxide base, in the absence of added hydrogen, to produce a catalytic desulfurization reaction which effectively converts from about 40 to 90 percent of the remaining sulfur into hydrogen sulfide, said reactions being carried out within the range of conditions substantially as described:

|  | Hydrodesulfurization Stage | Desulfurization Stage |
|---|---|---|
| E.I.T. Temp., °F. |  |  |
| Start-of-Run | 625–710 | 625–800 |
| End-of-Run | 850 | 850 |
| Pressure, Psig | 300–5000 | 50–3000 |
| Inlet Gas, SCFB | 500–10,000 |  |
| Volume % Hydrogen (% Purity) | 50–90 |  |
| Feed Rate, V/Hr./V | 0.1–10 | 0.05–10 |

13. The process of claim 12 wherein desulfurization within hydrodesulfurization and desulfurization stages is carried out in liquid phase within a range of conditions substantially as described below:

|  | Hydrodesulfurization Stage | Desulfurization Stage |
|---|---|---|
| E.I.T. Temp., °F. |  |  |
| Start-of-Run | 625–710 | 675–730 |
| End-of-Run | 800 | 765 |
| Pressure, Psig | 500–3000 | 150–1000 |
| Inlet Gas, SCFB | 1000–5000 |  |
| Volume % Hydrogen (% Purity) | 70–85 |  |
| Feed Rate, V/Hr./V | 0.5–2 | 0.5–2 |

14. The process of claim 12 wherein the catalyst is comprised of from about 1 to about 15 weight percent of nickel or cobalt sulfide, and from about 5 to about 25 weight percent of tungsten or molybdenum sulfide on an alumina support containing from about 1 to about 6 weight percent silica.

15. The process of claim 14 wherein the catalyst support has a surface area ranging in pores having a diameter of from about 30 to about 70 A diameter of at least about 100 m²/g.

16. The process of claim 12 wherein the desulfurization stage is operated at pressures sufficiently low that hydrogen is released, and hydrogen partial pressures generated within the said stage are lower than employed in the initial hydrodesulfurization stage.

17. The process of claim 12 wherein from about 60 to about 80 percent desulfurization is obtained in both the hydrodesulfurization and subsequent desulfurization stages, respectively.

18. The process of claim 12 wherein the sulfur-containing hydrocarbon feed is one wherein over 50 percent of the feed boils within a range of from about 700° F. to about 900° F., which contain from about 2 to about 5 percent sulfur; and including higher boiling materials and petroleum hydrocarbon residuum feedstocks which contain relatively large amounts of sulfur, asphaltenes, metals and ash.

* * * * *